US012764630B2

(12) United States Patent
Robinson

(10) Patent No.: US 12,764,630 B2
(45) Date of Patent: Oct. 13, 2026

(54) DELIVERING MESSAGES TO MULTIPLE NETWORK ENVIRONMENTS IN A WIRELESS COMMUNICATION SYSTEM

(71) Applicant: Boost SubscriberCo L.L.C., Englewood, CO (US)

(72) Inventor: Xiaowen S. Robinson, Great Falls, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 558 days.

(21) Appl. No.: 18/135,591

(22) Filed: Apr. 17, 2023

(65) Prior Publication Data

US 2023/0337103 A1 Oct. 19, 2023

Related U.S. Application Data

(60) Provisional application No. 63/332,204, filed on Apr. 18, 2022.

(51) Int. Cl.
*H04W 40/02* (2009.01)

(52) U.S. Cl.
CPC .................................. *H04W 40/02* (2013.01)

(58) Field of Classification Search
None
See application file for complete search history.

(56) References Cited

U.S. PATENT DOCUMENTS 11,659,471 B2 * 5/2023 Silver .................. H04M 3/546 370/259
2001/0027101 A1 * 10/2001 Koyama ................ H04W 8/20 455/433
2003/0228866 A1 * 12/2003 Pezeshki .............. H04W 8/245 455/414.1
2005/0070314 A1 * 3/2005 Wilson .................... H04W 4/14 455/466
2005/0079882 A1 4/2005 Lee et al.
2005/0181788 A1 * 8/2005 Muhonen ............... H04W 8/26 455/432.1
2010/0298014 A1 * 11/2010 Kamphuis .............. H04L 51/58 455/466
2012/0115457 A1 * 5/2012 Bouckaert ............. H04W 8/265 455/418

(Continued)

*Primary Examiner* — Brian S Roberts
(74) *Attorney, Agent, or Firm* — Lowenstein Sandler LLP

(57) ABSTRACT

A system includes a first network environment, a second network environment, and an aggregator. The first network environment is associated with a first plurality of numbers (e.g., MSISDN numbers) and the second network environment is associated with a second plurality of numbers. The first network environment is configured to receive messages associated with any of the first plurality of numbers, and the second network environment is configured to receive messages associated with any of the second plurality of numbers. The aggregator is configured to receive a message and determine whether a number associated with the message is included within the first plurality of numbers or the second plurality of numbers. Conditional upon determining that the number is included within either the first or second plurality of numbers, the aggregator is configured to transmit the message to either the first or second network environment.

20 Claims, 4 Drawing Sheets

(56) References Cited

U.S. PATENT DOCUMENTS

| | | | |
|---|---|---|---|
| 2016/0381531 | A1 | 12/2016 | Merrett |
| 2018/0013657 | A1* | 1/2018 | Cantwell ................. H04L 43/50 |
| 2022/0360953 | A1 | 11/2022 | Gundavelli et al. |
| 2023/0007448 | A1 | 1/2023 | Gundavelli et al. |

* cited by examiner

DELIVERING MESSAGES TO MULTIPLE NETWORK ENVIRONMENTS IN A WIRELESS COMMUNICATION SYSTEM

CROSS-REFERENCE TO RELATED APPLICATION

This application claims priority to U.S. Provisional Patent Application Ser. No. 63/332,204, filed on Apr. 18, 2022, the entirety of which is hereby incorporated by reference.

TECHNICAL FIELD

This specification relates to network environments such as 5G cellular network environments.

BACKGROUND

Network environments such as 5G cellular networks have been developed to connect people, machines, objects, and devices.

SUMMARY

The present disclosure relates to support for multiple network environments. A network environment, or simply an environment, as used in this document, refers to a set of multiple devices, modules, and functions that are configured to jointly enable wireless communication. For example, a network environment can include a 5G network that includes a set of multiple devices, radio access network (RAN)/core network functions, and application functions that are configured and integrated to jointly enable wireless communication. Different environments can serve different functions (e.g., a development environment, a pre-production environment, etc.) or can be operated by different departments or teams within a single business entity (e.g., an information technology team, a software development team, etc.).

A network environment can be associated with a network identifier, and each network identifier can correspond to a plurality of numbers (e.g., mobile station integrated services digital network [MSISDN] numbers) that each uniquely identify a mobile subscriber. Messages (e.g., short message service [SMS] or multimedia messaging service [MMS] messages) can be associated with particular numbers that identify particular mobile subscribers (e.g., a sender of a message), and the messages can be received by the network environments. In some implementations, a message associated with a particular number (and thus, a particular mobile subscriber) can be routed to a particular network environment based on the network identifier associated with the particular network environment and the plurality of numbers corresponding to the network identifier.

In some implementations, a network element referred to herein as a message aggregator can map one or more network identifiers (e.g., NNIDs) to one or more corresponding connections that are associated with one or more specific environments. The message aggregator can then transmit messages, based on a network identifier associated with each message, to specific environments via the corresponding connections. For example, the message aggregator can receive messages sent by one or more UE devices and can access a data storage element including a mapping of network identifiers (e.g., NNIDs) to corresponding connections associated with one or more specific environments in order to determine which one of multiple environments each message should be routed to. To do this, the message aggregator can determine that the number associated with a particular message is included within a particular plurality of numbers stored in the data storage element, and further determine the network identifier corresponding to the particular plurality of numbers. The message aggregator can then route the message to the environment associated with the network identifier via a corresponding connection.

In some implementations, the number (e.g., a MSISDN number) associated with a particular message can be assigned using over-the-air provisioning. Over-the-air provisioning is a wireless technology used to update and change data in a SIM card without having to reissue it. In some implementations, over-the-air provisioning can be utilized to enable multiple different numbers to be assigned to a single UE device. Thus, various messages sent by a single UE device may sometimes be associated with different numbers. This can have the advantage of ensuring that different messages sent from a single UE device can be routed to different network environments, which may be useful, for example, for the development and testing of different features in different network environments.

Network environments can be used for a variety of purposes. For example, an environment can be used for load, performance, and automation testing. An environment can take a beta load of a software release for new feature testing (e.g. non-3GPP interworking function [N3IWF] introduction testing). An environment can support testing of original equipment manufacturer [OEM] devices, Snapdragon [SD] chipsets, and/or radio access network [RAN] software. And an environment can be used for pre-production purposes to validate a patch, a fix, or a method of procedure [MOP] before production deployment, reproducing production issues for troubleshooting. These examples are not limiting, but simply illustrative. Other applications for employing network environments will be understood by those of ordinary skill in the art.

Various implementations of the technology described herein may provide one or more of the following advantages.

In some cases, by allowing routing of different messages/information to different environments, the technology described herein can enable the development and testing of multiple features simultaneously. This in turn can potentially also enable parallel work streams for multiple departments or teams within a single business entity, with each department or team working within a separate network environment. This can potentially allow for fast and efficient development of new technology features.

Testing and developing different features often require different network elements. For example, an IP Multimedia Subsystem (IMS) module may be required in some network environments for testing features related to voice calls, but the IMS module may not be required in other environments such as those used exclusively to test data-related features. By facilitating the routing of messages to multiple environments each tailored for particular applications, the technology described herein can provide the advantage of avoiding redundant network elements in particular environments or the redundant receipt of messages at multiple environments.

In a general aspect, a system is provided. The system includes a first network environment, a second network environment, and an aggregator. The first network environment is associated with a first plurality of numbers, wherein the first network environment is configured to receive messages associated with any of the first plurality of numbers. The second network environment is associated with a second plurality of numbers, wherein the second network environment is configured to receive messages associated with any of the second plurality of numbers. The aggregator is configured to receive a message and determine whether a number associated with the message is included within the first plurality of numbers or the second plurality of numbers. Conditional upon determining that the number is included within the first plurality of numbers, the aggregator is configured to transmit the message to the first network environment. Conditional upon determining that the number is included within the second plurality of numbers, the aggregator is configured to transmit the message to the second network environment.

Implementations of the system can include one or more of the following features. The message can be a short message service (SMS) message or a multimedia messaging service (MMS) message, and the aggregator can include at least one of a SMS gateway or a MMS gateway for transmitting the message to the first network environment or to the second network environment. The first network environment and the second network environment can each include at least one of a short message service center (SMSC) or a multimedia messaging service center (MMSC). The first plurality of numbers can be associated with a first identifier corresponding to the first network environment, and the second plurality of numbers can be associated with a second identifier corresponding to the second network environment. The system can include a data storage element that stores relationships between (i) the first identifier and the first plurality of numbers, and (ii) the second identifier and the second plurality of numbers. The first plurality of numbers and the second plurality of numbers can correspond to numbers that are assigned using over-the-air provisioning. The first network environment and the second network environment can be operated by a single business entity. The first network environment and the second network environment can be mutually exclusive. A portion of network elements of the first network environment can overlap with network elements of the second network environment. The first network environment can be operated to test a first network environment feature, wherein the second network environment is operated to test a second network environment feature that is distinct from the first network environment feature. The first network environment and the second network environment can be simultaneously operated. The first network environment can include a first set of network elements for testing the first network environment feature, and the second network environment can include a second set of network elements for testing the second network environment feature. The first set of network elements can be different from the second set of network elements.

In another general aspect, a method performed by a message aggregator, or by a system including multiple network environments and a message aggregator, is provided. The method includes receiving a message and determining whether a number associated with the message is included within a first plurality of numbers or a second plurality of numbers. The method further includes, conditional upon determining that the number is included within the first plurality of numbers, transmitting the message to a first network environment. The method further includes, conditional upon determining that the number is included within the second plurality of numbers, transmitting the message to a second network environment.

Implementations of the method can include one or more of the following features. Determining whether the number associated with the message is included within the first plurality of numbers or the second plurality of numbers can include accessing a data storage element that stores information indicative of the first plurality of numbers and the second plurality of numbers. Transmitting the message to the first network environment can include identifying a first identifier corresponding to the first network environment, the first identifier associated with the first plurality of numbers. Transmitting the message to the second network environment can include identifying a second identifier corresponding to the second network environment, the second identifier associated with the second plurality of numbers. Identifying the first identifier and identifying the second identifier can each include accessing a data storage element that stores relationships between: (i) the first identifier and the first plurality of numbers, and (ii) the second identifier and the second plurality of numbers. Receiving the message can include receiving the message at an aggregator including at least one of a short message service gateway (SMS-GW) or a multimedia messaging service gateway (MMS-GW). Transmitting the message to the first network environment and transmitting the message to the second network environment can each include transmitting the message via at least one of the short message service gateway (SMS-GW) or the multimedia messaging service gateway (MMS-GW). The method can include assigning the number associated with the message using over-the-air provisioning, prior to determining whether the number associated with the message is included within the first plurality of numbers or the second plurality of numbers. The first network environment and the second network environment can be operated by a single business entity. The first network environment and the second network environment can be mutually exclusive. A portion of network elements of the first network environment can overlap with network elements of the second network environment. The method can include operating the first network environment to test a first network environment feature and simultaneously operating the second network environment to test a second network environment feature that is distinct from the first network environment feature. The method can include configuring the first network environment to include a first set of network elements for testing the first network environment feature. The method can further include configuring the second network environment to include a second set of network elements, differing from the first set of network elements, for testing the second network environment feature.

In another general aspect, a non-transitory computer readable medium is provided. The non-transitory computer readable medium stores instructions that are executable by a processing device, and upon such execution cause the processing device to perform operations. The operations include receiving a message and determining whether a number associated with the message is included within a first plurality of numbers or a second plurality of numbers. The operations further include, conditional upon determining that the number is included within the first plurality of numbers, transmitting the message to a first network environment. The operations further include, conditional upon determining that the number is included within the second plurality of numbers, transmitting the message to a second network environment.

Implementations of the non-transitory computer readable medium can include one or more of the following features. Determining whether the number associated with the message is included within the first plurality of numbers or the second plurality of numbers can include accessing a data storage element that stores information indicative of the first plurality of numbers and the second plurality of numbers. Transmitting the message to the first network environment can include identifying a first identifier corresponding to the first network environment, the first identifier associated with the first plurality of numbers. Transmitting the message to the second network environment can include identifying a second identifier corresponding to the second network environment, the second identifier associated with the second plurality of numbers. Identifying the first identifier and identifying the second identifier can each include accessing a data storage element that stores relationships between: (i) the first identifier and the first plurality of numbers, and (ii) the second identifier and the second plurality of numbers. Receiving the message can include receiving the message at an aggregator including at least one of a short message service gateway (SMS-GW) or a multimedia messaging service gateway (MMS-GW). Transmitting the message to the first network environment and transmitting the message to the second network environment can each include transmitting the message via at least one of the short message service gateway (SMS-GW) or the multimedia messaging service gateway (MMS-GW). The operations can include assigning the number associated with the message using over-the-air provisioning, prior to determining whether the number associated with the message is included within the first plurality of numbers or the second plurality of numbers. The first network environment and the second network environment can be operated by a single business entity. The first network environment and the second network environment can be mutually exclusive. A portion of network elements of the first network environment can overlap with network elements of the second network environment. The operations can include operating the first network environment to test a first network environment feature and simultaneously operating the second network environment to test a second network environment feature that is distinct from the first network environment feature. The operations can include configuring the first network environment to include a first set of network elements for testing the first network environment feature. The operations can further include configuring the second network environment to include a second set of network elements, differing from the first set of network elements, for testing the second network environment feature.

Other features and advantages of the description will become apparent from the following description, and from the claims. Unless otherwise defined, the technical and scientific terms used herein have the same meaning as commonly understood by one of ordinary skill in the art to which this invention belongs.

DETAILED DESCRIPTION

Figure 1:
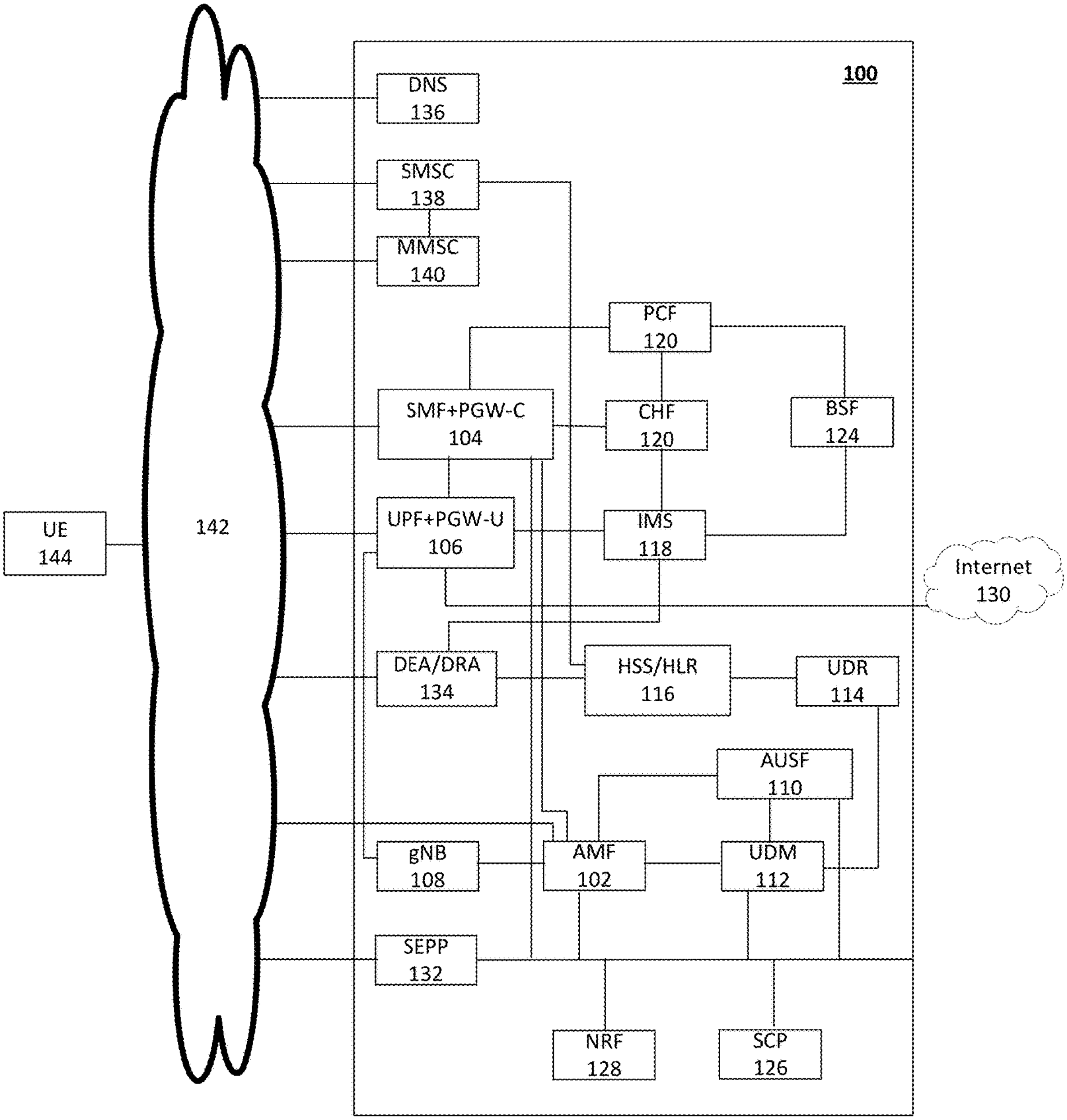
FIG. 1 is a diagram of an exemplary network environment and a user equipment (UE) device connected to the exemplary network environment.

FIG. 1 depicts a diagram of an exemplary network environment 100 and a user equipment (UE) device 144 connected to the exemplary network environment. As used herein, a network environment (sometimes referred to herein simply as an environment) refers to a set of multiple devices, modules, and functions that are configured to jointly enable wireless communication. For example, a network environment can include a 5G network that includes a set of multiple devices, radio access network (RAN)/core network functions, and application functions that are configured and integrated to jointly enable wireless communication. An environment, such as the environment 100, can be a portion of a 5G New Radio ("5G-NR" or simply "5G") cellular network environment. Standards for 5G cellular network architectures have previously been described, for example, in 3GPP TS 23.501 (for 5G networks) and 3GPP TS 23.401 (for long-term evolution "LTE" networks) (the entireties of which are hereby incorporated by reference). The lines depicted in FIG. 1 that connect network elements are indicative of the possibility of direct communication between those network elements.

Network environment 100 includes a packet core network, which includes an access management function (AMF) 102, a session management function and packet data network gateway-control module (SMF+PGW-C) 104, a user plane function and packet data network gateway-user plane module (UPF+PGW-U) 106, and a policy control function (PCF) 120. The AMF 102 receives all connection and session related information from one or more user equipment (UE) devices 144, and handles connection and mobility management tasks. The AMF 102 forwards all messages related to session management to the SMF+PGW-C module 104. The SMF+PGW-C module 104 and UPF+PGW-U module 106 jointly manage sessions and are configured using Control and User Plane Separation (CUPS). The PCF 120 communicates with the SMF+PGW-C module 104, governing control plane functions via defined policy rules. The UPF+PGW-U module 106 can provide access to the Internet 130 for data applications and the IP Multimedia Subsystem (IMS) core module 118 for voice applications. The IMS core module 118 is a separate application core network from the packet core network and supports voice services, messaging, voice calls, etc.

The environment 100 can further include a charging function (CHF) 122 and a binding support function (BSF) 124. The CHF 122 supports online and offline charging features and completes billing functions. The BSF 124 tracks sessions that are located anywhere in the environment 100, but share common criteria, such as subscriber identifiers. The BSF 124 communicates with the PCF 120 and binds application-function requests to specific PCF instances, enabling policy scaling of the environment 100.

The environment 100 also includes a gNB 108 (i.e., a 5G base station), which handles run-side aspects of the network environment 100 and communicates, either directly or indirectly, with the packet core network elements such as AMF 102, SMF+PGW-C module 104, and UPF+PGW-U module 106.

The environment 100 further includes network elements to manage user or subscriber information. For example, the environment 100 includes an authentication service function (AUSF) 110 for user authentication and a unified data management (UDM) module 112. The user database is stored in a unified data repository (UDR) 114. The UDM 112 communicates with the AMF 102, AUSF 110, and the UDR 114 to provide centralized control of network user data. For interworking with 2G, 3G, and 4G network elements, the environment 100 also includes a Home Subscriber System and Home Location Register (HSS/HLR) module 116, which stores subscriber information, location and SIM details, and authentication keys.

The environment 100 further includes a service communication proxy (SCP) 126 and a network repository function (NRF) 128. In accordance with current 5G standards, network functions are based on HTTP version 2, and use the SCP 126 and NRF 128 to communicate. The NRF 128 is used to discover network functions in the environment 100, and the SCP 126 is used to provide a single point of entry for a cluster of discovered network functions, serving as a central control point in the signaling network core.

The environment 100 further includes a security edge protection proxy (SEPP) 132, a diameter edge agent and diameter routing agent (DEA/DRA) module 134, and a domain name system (DNS) 136. The SEPP 132 is a security proxy through which all signaling traffic across operator networks is expected to transit. The DEA/DRA module 134 manages traffic and congestion of messages (e.g., Diameter messages) routed across the environment 100, routing signaling traffic and performing load balancing, relay, proxy and redirect functions within a carrier or interworking with other carriers. The DNS 136 is a naming database in which internet domain names are located and translated into internet protocol (IP) addresses.

The environment 100 further includes a short message service center (SMSC) 138 and a multimedia message service center (MMSC) 140 configured to receive, store, route, and forward SMS messages and MMS messages, respectively.

The network environment 100 is configured to interact with external systems 142, and the UE 144 can interact with the network environment 100 indirectly through the external systems 142. In some implementations, the external systems 142 can include another network such as a 4G or 5G roaming partner network or a non-3GPP access network. For example, the environment 100 can interact with a roaming partner network using an IP Packet eXchange (IPX) telecommunications interconnection model provided between the two network environments. In other examples, the environment 100 can interact directly with the roaming partner network environment without an IPX provider in between the two networks.

In some implementations, the external systems 142 can include a message aggregator configured to aggregate messages and route a portion of the aggregated messages to the environment 100. For example, the aggregated messages can be SMS or MMS messages.

The UE 144 can interact with the network environment 100 indirectly through the external systems 142 or directly with the network environment 100 (e.g., via the gNB 108). In some cases, the UE 144 can be a subscriber to the network environment 100 (e.g., a subscriber to a service provider of the cellular network). In other cases, the UE 144 can be a non-subscriber roaming on the network environment 100.

Figure 2:
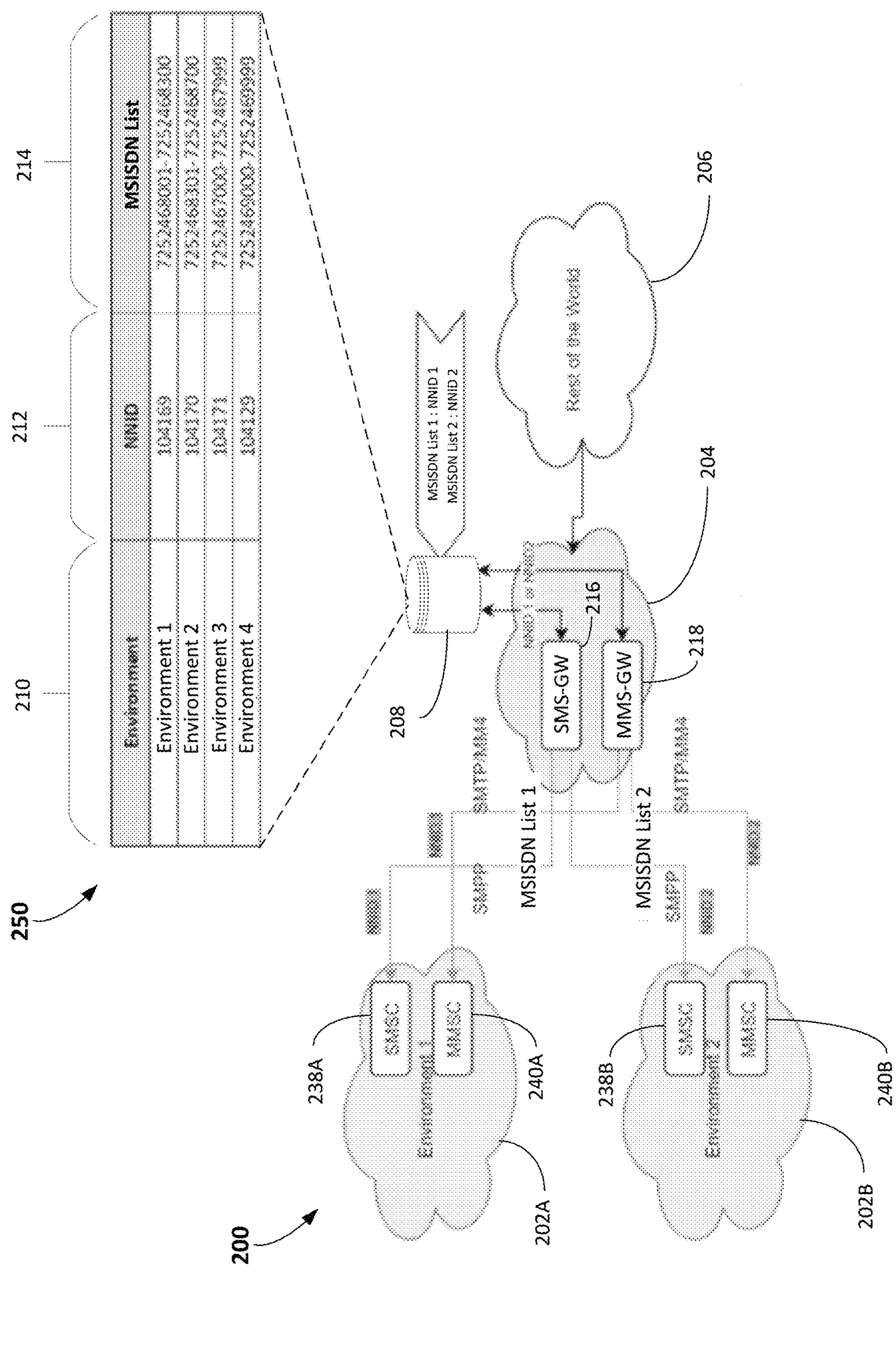
FIG. 2 is a diagram of a system that transmits messages among multiple environments.

Referring now to FIG. 2, a system 200 is illustrated including a message aggregator 204 and multiple environments 202A, 202B. Each of the environments 202A, 202B can include substantially similar network elements to the exemplary environment 100 described in relation to FIG. 1. For example, as shown in FIG. 2, network environment 202A includes SMSC 238A and MMSC 240A (analogous to SMSC 138A and MMSC 140A of network environment 100). Similarly, network environment 202B includes SMSC 238B and MMSC 240B.

In some implementations, the environments 202A, 202B can be operated by a single business entity. In some implementations, the environments 202A, 202B can serve different functions. For example, environment 202A can be a development environment while environment 202B can be a pre-production environment for testing new features. Other illustrative examples of network environments and their potential use cases are envisioned. For example, an environment can be used for load, performance, and automation testing. An environment can take a beta load of a software release for new feature testing (e.g. non-3GPP interworking function [N3IWF] introduction testing). An environment can support testing of original equipment manufacturer [OEM] devices, Snapdragon [SD] chipsets, and/or radio access network [RAN] software. And an environment can be used for pre-production purposes to validate a patch, a fix, or a method of procedure [MOP] before production deployment, reproducing production issues for troubleshooting. These examples are not limiting, but simply illustrative. Other applications for employing network environments will be understood by those of ordinary skill in the art.

In some implementations, the environments 202A, 202B can be operated by different departments or teams within a single business entity. For example, environment 202A can be operated by an information technology team while environment 202B can be operated by a software development team. The presence of multiple environments can enable the development and testing of multiple features simultaneously. It can also enable parallel work streams for multiple departments or teams within a single business entity, with each department or team working within a separate network environment. This can increase the speed and ease of developing new technology features.

In some implementations, environments 202A, 202B can be mutually exclusive (or isolated) networks. This means that they do not share any network elements. In other implementations, the environments 202A, 202B can share a portion of their network elements (e.g., an IMS module or one or more database components). When performing development or testing of new features, different features may not require every environment to have the same network elements. Thus, in some implementations, an environment may not include certain network elements at all. For example, an IMS module (e.g., IMS module 118) may be required in some network environments for testing features related to voice calls. However, the IMS module may not be required in other environments such as those in which only data-related features are tested. One advantage of performing development and testing of new features in separate environments (e.g., environments 202A, 202B) is that each environment can be tailored for specific testing purposes and can streamline feature testing by enabling the parallelization of feature testing.

The message aggregator 204 receives messages from the rest of the world 206 (e.g., from one or more roaming partner networks, from one or more interworked carrier networks, etc.) and routes the messages to the environments 202A, 202B depending on a number (e.g., a MSISDN number) associated with each message. In some implementations, prior to being received by the message aggregator 204, the MSISDN number for a particular message can be assigned using over-the-air provisioning so that different messages received from a single piece of user equipment (UE) can be received at different environments (e.g., environments 202A, 202B). This is made possible because MSISDN numbers are not immutably associated with a particular UE device or a UE device's SIM card, but can be assigned using over-the-air provisioning.

In order to determine which of the environments 202A, 202B to send the received messages to, the message aggregator 204 can access a data storage element 208 (e.g., a database). The data storage element 208 stores lists of numbers 214 (e.g., MSISDN numbers), as well as relationships between the lists of numbers 214 and network identifiers 212 (e.g., NetNumber ID [NNID] values). In some implementations, the data storage element 208 stores this information in the form of a data table 250. Each network identifier 212 can correspond to a particular environment (e.g., environments 202A, 202B). In some implementations, the data storage element 208 can further store relationships between the network identifiers 212 and corresponding environment names 210 (e.g., "Environment 1," "Environment 2," "Environment 3," "Environment 4"). However, in other implementations, the data storage element 208 may not include the environment names 210 or their relationships with the network identifiers 212.

For each message received at the message aggregator 204, the message aggregator 204 compares a number (e.g., a MSISDN number) associated with the received message to the lists of numbers 214 stored in the data storage element 208. While the lists of numbers 214 shown in FIG. 2 includes groupings of consecutive numbers, the numbers of each list of numbers 214 need not be consecutive in some implementations. Upon determining that the number associated with the received message is included within a particular list of numbers stored within the data storage element 208, the message aggregator 204 identifies a corresponding network identifier from the network identifiers 212 and transmits the message to a particular environment (e.g., environment 202A or environment 202B) based on the corresponding network identifier. If the message is a SMS message, the message aggregator 204 will transmit the message to the relevant environment via a SMS gateway (SMS-GW) 216. Alternatively, if the message is a MMS message, the message aggregator 204 will transmit the message to the relevant environment via a MMS gateway (MMS-GW) 218.

As an example, if a message received at the message aggregator 204 is associated with an MSISDN number of "7252468002," then the message aggregator 204 will access the data storage element 208 and identify, based on the data table 250, that the corresponding network identifier value (i.e., NNID value) is "104169." If environment 202A is associated with network identifier value "104169," then the message aggregator 204 will send the message to the environment 202A.

As another example, if the message received at the message aggregator 204 is associated with an MSISDN number of "7252468305," then the message aggregator 204 will access the data storage element 208 and identify, based on the data table 250, that the corresponding network identifier value (i.e., NNID value) is "104170." If environment 202B is associated with network identifier value "104170," then the message aggregator 204 will send the message to the environment 202B instead of the environment 202A.

Figure 3:
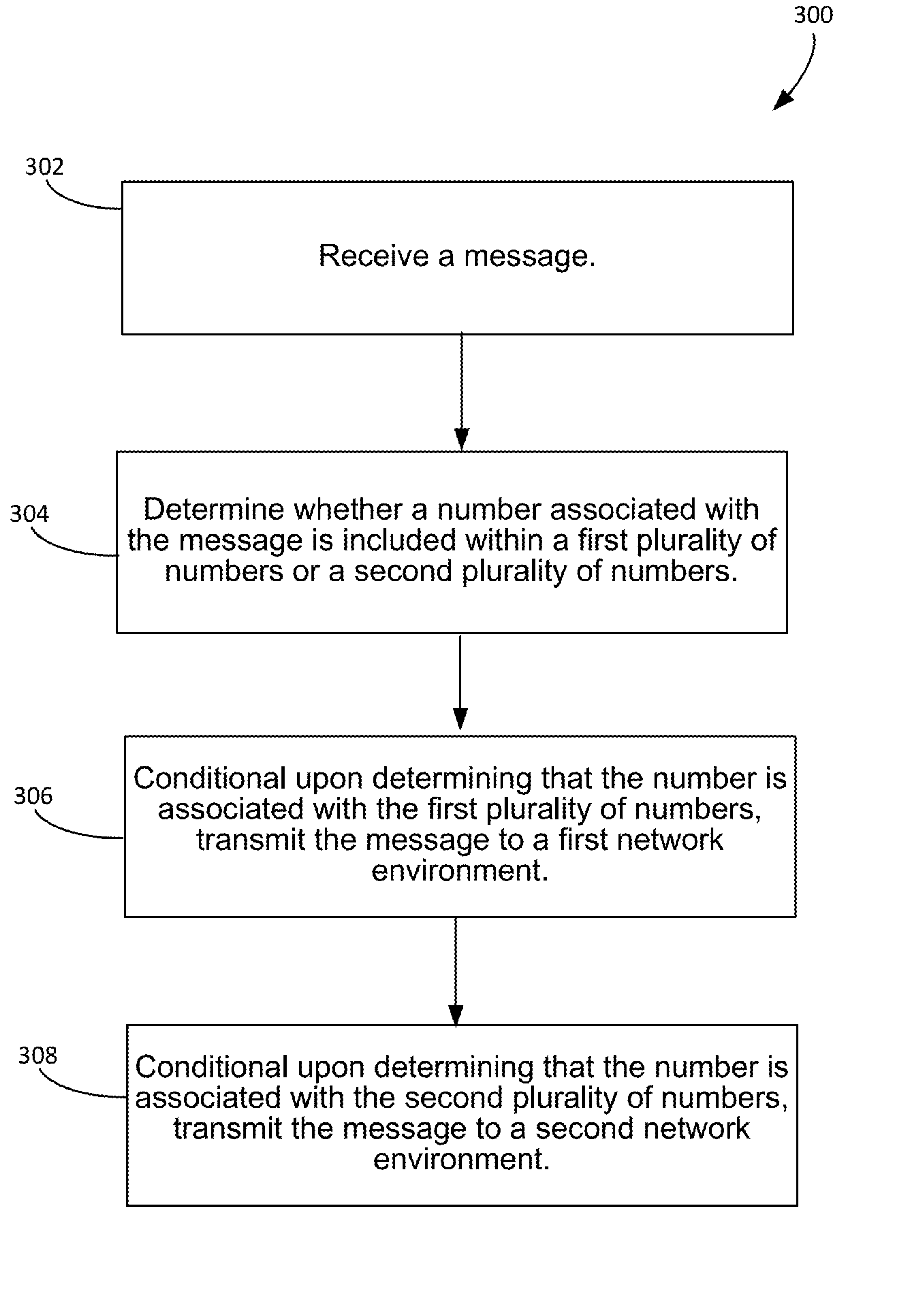
FIG. 3 is a flowchart of a process for transmitting messages among multiple environments.

FIG. 3 illustrates an example process 300 for transmitting messages among multiple environments. Operations of the process 300 can be executed by a system that includes multiple environments and a message aggregator. Operations of the process 300 can also be executed by the message aggregator alone.

Operations of the process 300 can include receiving a message (302). The message can be a SMS or a MMS message, and the message can be received at a message aggregator (e.g., message aggregator 204). The message aggregator can include at least one of a SMS-GW (e.g., SMS-GW 216) or a MMS-GW (e.g., MMS-GW 218).

Operations of the process 300 also include determining whether a number associated with the message is included within a first plurality of numbers or a second plurality of numbers (304). This can include accessing a data storage element (e.g., data storage element 208) that stores information indicative of the first plurality of numbers and the second plurality of numbers (e.g., in data table 250). In some implementations, the numbers can be MSISDN numbers.

Operations of the process 300 also include, conditional upon determining that the number is associated with the first plurality of numbers, transmitting the message to a first network environment (306). Transmitting the message to the first network environment can include identifying a first identifier (e.g., a network identifier such as a NNID value) corresponding to the first network environment, the first identifier being associated with the first plurality of numbers. Identifying the first identifier can include accessing a data storage element (e.g., data storage element 208) that stores relationships between the first identifier and the first plurality of numbers. Transmitting the message to the first network environment can also include transmitting the message via at least one of a SMS-GW or a MMS-GW.

Operations of the process 300 also include, conditional upon determining that the number is associated with the second plurality of numbers, transmitting the message to a second network environment (308). Transmitting the message to the second network environment can include identifying a second identifier (e.g., a network identifier such as a NNID value) corresponding to the second network environment, the second identifier being associated with the second plurality of numbers. Identifying the second identifier can include accessing a data storage element (e.g., data storage element 208) that stores relationships between the second identifier and the second plurality of numbers. Transmitting the message to the second network environment can also include transmitting the message via at least one of a SMS-GW or a MMS-GW.

Optionally, the process 300 can also include assigning the number associated with the message using over-the-air provisioning, prior to determining whether the number associated with the message is included within the first plurality of numbers or the second plurality of numbers. This can enable different messages received from a single user equipment (UE) device to be received at different environments.

Figure 4:
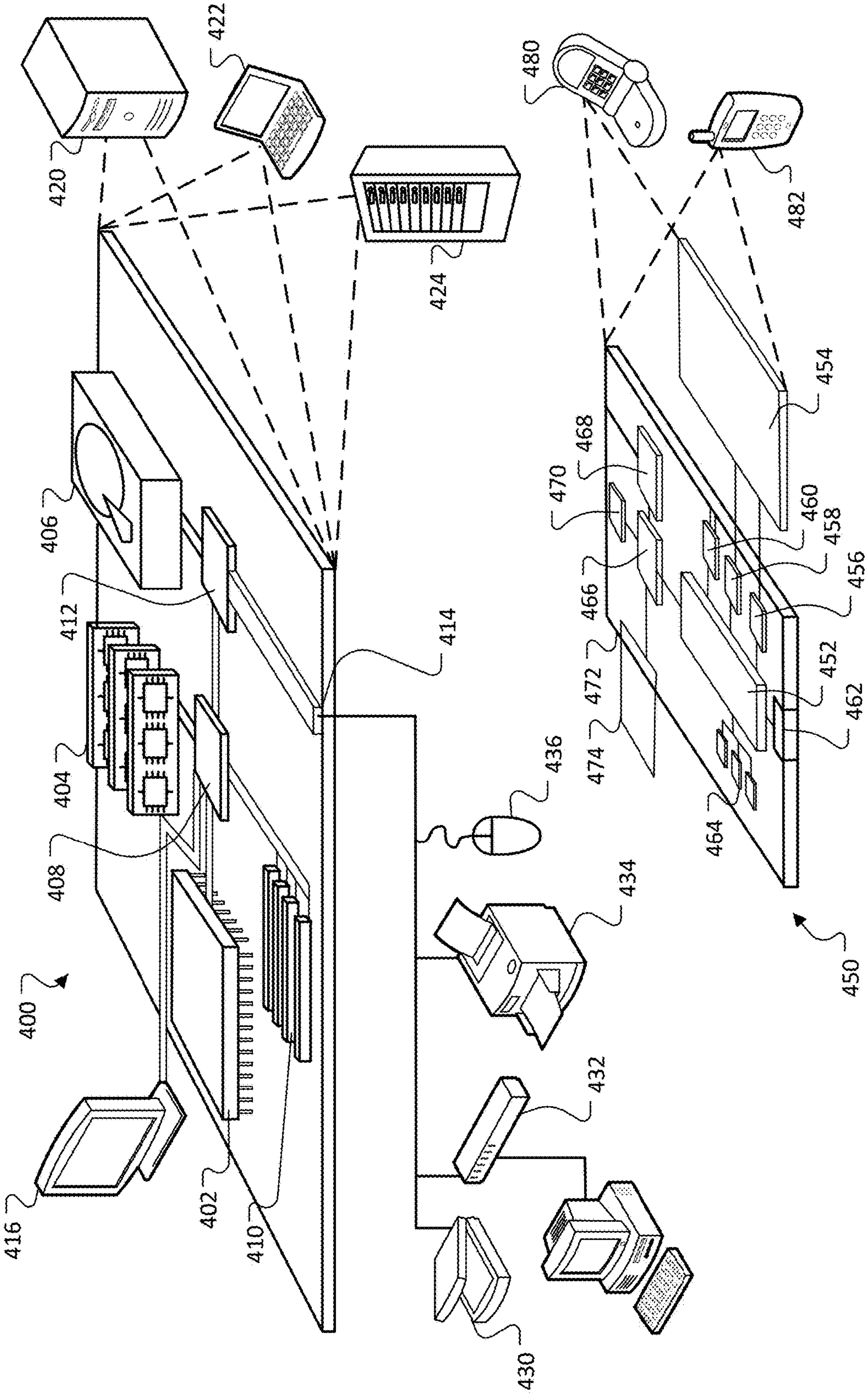
FIG. 4 is a diagram illustrating an example of a computing environment.

FIG. 4 shows an example of a computing device 400 and a mobile computing device 450 that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 400 and/or the mobile computing device 450 can form at least a portion of the network environments (e.g., environments 100, 202A, 202B) described above. The computing device 400 and/or the mobile computing device 450 can also form at least a portion of the UE devices (e.g., UE device 144) described above. The computing device 400 and/or the mobile computing device 450 can also form at least a portion of a message aggregator, such as message aggregator 204 described above in relation to FIG. 2. In some implementations, the network functions and/or network entities described above can be implemented using a cloud infrastructure including multiple computing devices 400 and/or mobile computing devices 450.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system). The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS), IP Multimedia Subsystem (IMS) technologies, 4G LTE technologies, and 5G technologies. Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the UE described with respect to FIG. 1. Other implementations may include a phone device 480, a personal digital assistant 482, and a tablet device (not shown). The mobile computing device 450 may also be implemented as a component of a smart-phone, AR device, or other similar mobile device.

The computing device 400 may be implemented in the network environments 100, 202A, 202B described above with respect to FIGS. 1-3. The computing device 400 may also be implemented in the message aggregator 204 described above with respect to FIG. 2.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

What is claimed is:

1. A system comprising:

a first network environment associated with a first plurality of numbers and comprising a first set of network elements, wherein the first network environment is operated to test a first network environment feature, wherein the first set of network elements is for testing the first network environment feature, and wherein the first network environment is configured to receive messages associated with any of the first plurality of numbers;

a second network environment associated with a second plurality of numbers and comprising a second set of network elements, wherein the second network environment is operated to test a second network environment feature that is distinct from the first network environment feature, wherein the second set of network elements is for testing the second network environment feature, wherein the first set of network elements is different from the second set of network elements, wherein the second set of network elements includes at least one network element that is not present in the first set of network elements, and wherein the second network environment is configured to receive messages associated with any of the second plurality of numbers; and an aggregator configured to:

receive a message, determine whether a number associated with the message is included within the first plurality of numbers or the second plurality of numbers, conditional upon determining that the number is included within the first plurality of numbers, transmit the message to the first network environment; and conditional upon determining that the number is included within the second plurality of numbers, transmit the message to the second network environment to be processed by the at least one network element that is not present in the first set of network elements.

2. The system of claim 1, wherein the message is a short message service (SMS) message or a multimedia messaging service (MMS) message, and wherein the aggregator comprises at least one of an SMS gateway or an MMS gateway for transmitting the message to the first network environment or to the second network environment.

3. The system of claim 1, wherein the first network environment and the second network environment each comprises at least one of a short message service center (SMSC) or a multimedia messaging service center (MMSC).

4. The system of claim 1, wherein the first plurality of numbers is associated with a first identifier corresponding to the first network environment, and wherein the second plurality of numbers is associated with a second identifier corresponding to the second network environment.

5. The system of claim 4, further comprising a data storage element that stores relationships between (i) the first identifier and the first plurality of numbers, and (ii) the second identifier and the second plurality of numbers.

6. The system of claim 1, wherein the first plurality of numbers and the second plurality of numbers correspond to numbers that are assigned using over-the-air provisioning.

7. The system of claim 1, wherein the first network environment and the second network environment are operated by a single business entity.

8. The system of claim 1, wherein the first network environment and the second network environment are mutually exclusive.

9. The system of claim 1, wherein a portion of network elements of the first network environment overlaps with network elements of the second network environment.

10. A method comprising:

receiving a message;

determining whether a number associated with the message is included within a first plurality of numbers or a second plurality of numbers;

configuring a first network environment to comprise a first set of network elements;

operating the first network environment to test a first network environment feature, wherein the first set of network elements is for testing the first network environment feature;

configuring a second network environment to comprise a second set of network elements, wherein the second set of network elements includes at least one network element that is not present in the first set of network elements, wherein the first set of network elements is different from the second set of network elements;

simultaneously operating the second network environment to test a second network environment feature that is distinct from the first network environment feature, wherein the second set of network elements is for testing the second network environment feature;

conditional upon determining that the number is included within the first plurality of numbers, transmitting the message to the first network environment; and conditional upon determining that the number is included within the second plurality of numbers, transmitting the message to the second network environment to be processed by the at least one network element that is not present in the first set of network elements.

11. The method of claim 10, wherein determining whether the number associated with the message is included within the first plurality of numbers or the second plurality of numbers comprises accessing a data storage element that stores information indicative of the first plurality of numbers and the second plurality of numbers.

12. The method of claim 10, wherein transmitting the message to the first network environment comprises identifying a first identifier corresponding to the first network environment, the first identifier associated with the first plurality of numbers, and wherein transmitting the message to the second network environment comprises identifying a second identifier corresponding to the second network environment, the second identifier associated with the second plurality of numbers.

13. The method of claim 12, wherein identifying the first identifier and identifying the second identifier each comprises accessing a data storage element that stores relationships between:

(i) the first identifier and the first plurality of numbers, and (ii) the second identifier and the second plurality of numbers.

14. The method of claim 10, wherein receiving the message comprises receiving the message at an aggregator comprising at least one of a short message service gateway (SMS-GW) or a multimedia messaging service gateway (MMS-GW).

15. The method of claim 14, wherein transmitting the message to the first network environment and transmitting the message to the second network environment each comprises transmitting the message via at least one of the short message service gateway (SMS-GW) or the multimedia messaging service gateway (MMS-GW).

16. The method of claim 10, further comprising, assigning the number associated with the message using over-the-air provisioning, prior to determining whether the number associated with the message is included within the first plurality of numbers or the second plurality of numbers.

17. The method of claim 10, wherein the first network environment and the second network environment are operated by a single business entity.

18. The method of claim 10, wherein the first network environment and the second network environment are mutually exclusive.

19. The method of claim 10, wherein a portion of network elements of the first network environment overlaps with network elements of the second network environment.

20. A non-transitory computer readable medium storing instructions that are executable by a processing device, and upon such execution cause the processing device to perform operations comprising:

receiving a message;

determining whether a number associated with the message is included within a first plurality of numbers or a second plurality of numbers;

configuring a first network environment to comprise a first set of network elements;

operating the first network environment to test a first network environment feature, wherein the first set of network elements is for testing the first network environment feature;

configuring a second network environment to comprise a second set of network elements, wherein the second set of network elements includes at least one network element that is not present in the first set of network elements, wherein the first set of network elements is different from the second set of network elements;

simultaneously operating the second network environment to test a second network environment feature that is distinct from the first network environment feature, wherein the second set of network elements is for testing the second network environment feature;

conditional upon determining that the number is included within the first plurality of numbers, transmitting the message to the first network environment; and conditional upon determining that the number is included within the second plurality of numbers, transmitting the message to the second network environment to be processed by the at least one network element that is not present in the first set of network elements.

* * * * *